A. M. CONDIT.
REMOVABLE TIRE FOR VEHICLES.
APPLICATION FILED SEPT. 12, 1906.
924,429.
Patented June 8, 1909.
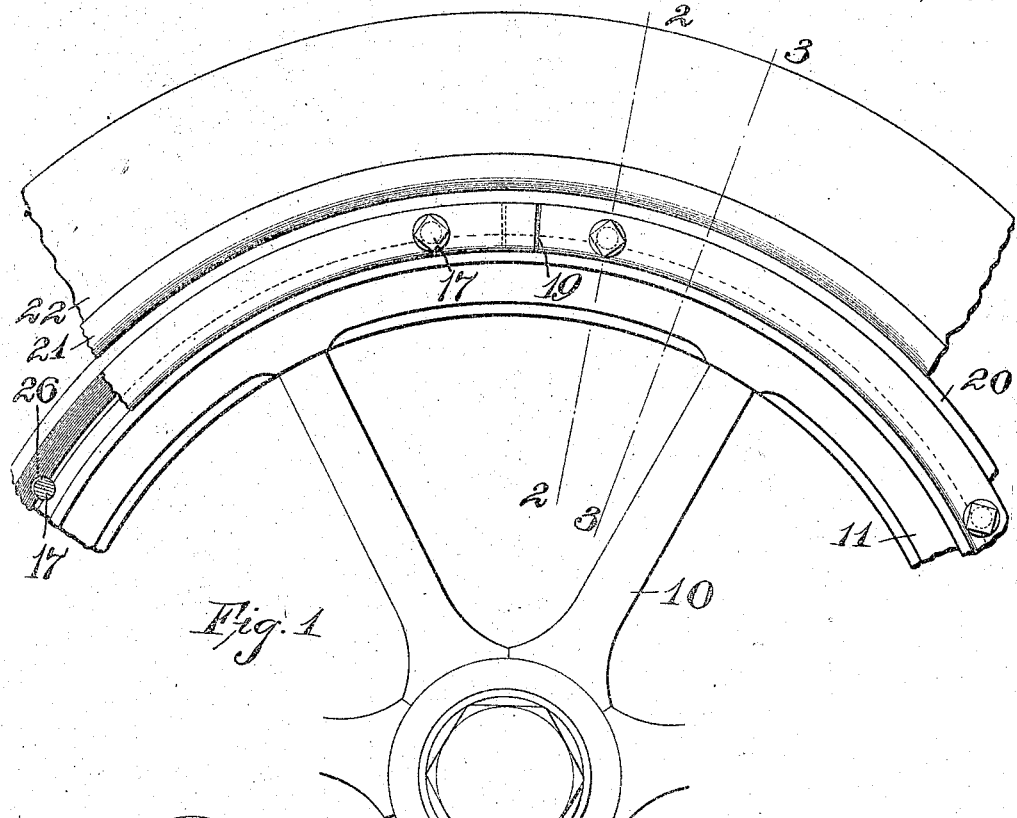
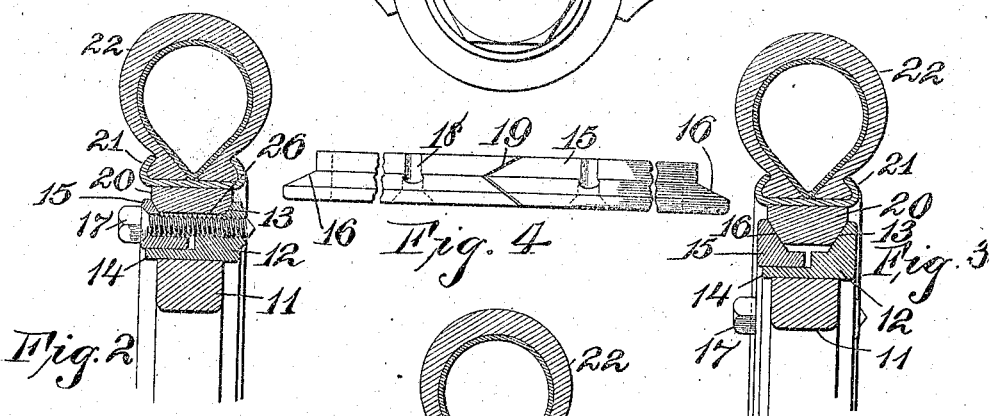
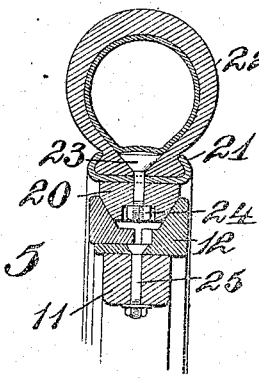
WITNESSES:
E. A. Pell
Ralph Lancaster
INVENTOR
Arthur M. Condit,
BY
Wm. H. Campfield,
ATTORNEYS

UNITED STATES PATENT OFFICE.

ARTHUR M. CONDIT, OF EAST ORANGE, NEW JERSEY.

REMOVABLE TIRE FOR VEHICLES.

No. 924,429.

Specification of Letters Patent.

Patented June 8, 1909.

Application filed September 12, 1906. Serial No. 334,231.

*To all whom it may concern:*

Be it known that I, ARTHUR M. CONDIT, a citizen of the United States, residing at East Orange, in the county of Essex and State of New Jersey, have invented certain new and useful Improvements in Removable Tires for Vehicles; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a vehicle wheel that is provided with an inflated pneumatic tire, and the invention is designed to provide a tire that, with its rim, is detachable, so that the rim and the inflated tire can be removed or affixed to the wheel to overcome the present objectionable method of deflating a tire, prior to removal, and then going through the necessary operation of inflating it again after it is in place.

The invention provides a tire with a rim attached, that slide over the felly of a wheel, and a further object of the invention is to provide means for clamping or wedging the rim on the wheel so that it will not become displaced, and also provides a quick means for removing the rim and its tire.

An advantage of the present construction is a split ring forming a wedging means, on one side of the wheel, that holds itself in place while the bolts of the wheel are being attached.

The invention is illustrated in the accompanying drawings, in which—

Figure 1 is a side view of the portion of a wheel with the improved detachable tire and its rim in place. Fig. 2 is a section on line 2, 2, in Fig. 1, and Fig. 3 is a section on line 3, 3, in Fig. 1. Fig. 4 is a broken elevation of the split ring used in the wheel, and Fig. 5 is a section similar to Fig. 3 showing a modified form of structure.

In the present device, I use any ordinary construction of wheel 10 provided with a felly 11, and secured to the felly 11, in any well known manner, is the annular flanged ring 12 which has a tapered face 13 and the portion 14 fitting over the felly. Sliding on the portion 14 is the split ring 15 that has the wedge-shaped or tapered face 16 opposed to the face 13 of the ring 12. These two elements, 12 and 15, are drawn tightly together or released from one another by means of the bolts 17. The ring 15 is perforated as at 18, for the reception of these bolts and is split, as shown in Fig. 4, at 19. This ring is made slightly smaller, normally, on its inside edge, than the circumference of the portion 14 of the ring 12 which is solid, thus when the split ring 15 is sprung into place, the spring action will cause it to grip itself around the portion 14 so that it will not be necessary to hold the ring in place while the bolts 17 are being inserted.

When the elements 12 and 15 are drawn together, the opposed chamfered or wedge-shaped faces 13 and 16 bear against the edges of an annular ring 20, which is provided with beveled edges so that it is tightly forced into place when the rings 12 and 15 are brought together. Attached to the ring 20, in any way usual in the wheel construction, is the clamping rim 21 which holds the tire 22 in place and makes a solid structure. It will thus be seen that when the rim is to be taken off it is only necessary to remove the bolts 17 and take off the ring 15, when the rim 20, with its tire, can be removed without deflating the tire any, and in the same way a tire can be put on, and after the ring 15 is in place it is securely held. Under this construction extra tires can be carried, by automobiles, inflated and can be put on in this inflated shape which does not necessitate the pumping up of the tire after it is in place, and it will also be seen that this will be a big advantage to racing machines on account of the time saved in removing a tire.

In Fig. 5 I illustrate a modified form where a bolt 23 is used to spread the edges of the tire apart to fit under the over lapping portions of the rim 21, and it passes down through the ring 20 and is provided with a nut 24 to clamp all the parts together. In all the constructions, the ring 12 and the felly 11 can be fastened by means of the bolts 25, shown in Fig. 5. At the points where the bolts 17 are placed, the rim 20 is cut away, as at 26, shown in Figs. 1 and 2. This prevents any circular movement between the wedge-shaped rings and the rim 20 and provides for the transmission of power to the rim, if there should be a slip between the opposed beveled faces of the clamping rings.

Having thus described my invention, what I claim is:—

A wheel comprising a felly, a ring secured to the felly and having a portion of its face parallel with the axis of the wheel and the remainder of the face beveled, a ring having a V-shaped transverse split, the split ring being adapted to slide on the parallel portion of the first ring and having a beveled face opposed to the beveled face on the first ring, a rim having a tire attached to its outer periphery and having its inner edges beveled to engage the beveled faces of the rings, and bolts passing through the beveled rings to draw them together, the split ring being adapted to be sprung on the first ring and hold itself and the rim in place by its spring action before and while the bolts are attached.

In testimony, that I claim the foregoing, I have hereunto set my hand this 16th day of August, 1906.

ARTHUR M. CONDIT.

Witnesses:
 Wm. H. Camfield,
 E. A. Pell.